(12) United States Patent
Hiroki et al.

(10) Patent No.: US 7,303,621 B2
(45) Date of Patent: Dec. 4, 2007

(54) INK COMPOSITION FOR INKJET

(75) Inventors: Masashi Hiroki, Yokohama (JP); Takaya Kitawaki, Izunokuni (JP); Hiroshi Kiyomoto, Hiratsuka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 266 days.

(21) Appl. No.: 11/216,976

(22) Filed: Aug. 31, 2005

(65) Prior Publication Data

US 2007/0044683 A1 Mar. 1, 2007

(51) Int. Cl.
*C09D 11/00* (2006.01)

(52) U.S. Cl. .................................. 106/31.86

(58) Field of Classification Search ............... 106/31.86
See application file for complete search history.

(56) References Cited

FOREIGN PATENT DOCUMENTS

| JP | 2001-220527 A | 8/2001 |
|---|---|---|
| JP | 2002-363465 A | 12/2002 |
| JP | 2003-96370 A | 4/2003 |
| JP | 2003-261808 A | 9/2003 |
| JP | 2004-250502 A | 9/2004 |
| JP | 2004-250503 A | 9/2004 |

OTHER PUBLICATIONS

U.S. Appl. No. 11/413,558, filed: Apr. 28, 2006, Inventors: Masashi Hiroki et al, Title: Non-Aqueous Ink Composition for Inkjet.
Related U.S. Appl. No. 11/299,199, filed Dec. 8, 2005; Inventors: Takaya Kitawaki et al.; Title: Non-Aqueous Ink Composition for Inkjet.
Related U.S. Appl. No. 11/221,125, filed Sep. 6, 2005; Inventors: Masashi Hiroki et al.; Title: Ink Composition for Inkjet.

*Primary Examiner*—J. A. Lorengo
*Assistant Examiner*—Veronica Faison-Gee
(74) *Attorney, Agent, or Firm*—Frishauf, Holtz, Goodman & Chick, P.C.

(57) ABSTRACT

An inkjet ink composition is provided, which includes pigment, a dispersing agent, and polyalkylene glycol monoether as a solvent. This ink composition is characterized in that the polyalkylene glycol monoether polyalkylene glycol monoether is constituted by 50-90 wt %, based on an entire quantity of the solvent, of tetraethylene glycol monobutylether, and the balance of triethylene glycol monobutylether.

5 Claims, No Drawings

INK COMPOSITION FOR INKJET

BACKGROUND OF THE INVENTION

1. Field of the Invention

This invention relates to an inkjet ink composition.

2. Description of the Related Art

In recent years, a recording apparatus employing an inkjet system has been widely utilized at home, in the office and industry. In the recording apparatus employing an inkjet system, an ink to be employed therein is selected from a water-based ink, a non-aqueous ink and a UV ink depending on applications. Since the water-based ink is cheap and excellent in safety, it is widely used for various applications. The water-based ink however cannot be dried quickly enough to be applied to a high-speed printing. Moreover, when the water-based ink is employed for printing on a plain paper (PPC paper), a phenomenon of so-called cockling where the paper is cockled after the ink has been dried occurs. Since the UV ink can be quickly cured as it is irradiated with ultraviolet ray, the UV ink is suited for use in the printing on a non-absorptive media or in a high-speed printing. However, it is required, in the application of the UV ink, to employ an ultra-violet ray irradiating apparatus which is large in scale and in power consumption.

Whereas, when an oil based ink is employed for the printing on a plain paper, the ink penetrates into a recording paper within a short period of time as soon as drops of ink discharged from an inkjet head are impinged against the paper. Therefore, the oil based ink is suited for use in a high-speed printing without necessitating any special mechanism and is capable of obtaining excellent printed images without generating cockling.

However, since the solvent included in an oil based ink is hardly volatilized, there is a problem especially when the oil based ink is printed on a plain paper that printed portions are permitted to look through from the reverse side of paper (or a phenomenon of so-called strike-through) due to the residual solvent component in the paper.

BRIEF SUMMARY OF THE INVENTION

In the office or at home, the printed images are quite frequently preserved in a transparent file such that they are sandwiched between a pair of transparent films. Since most of the transparent file to be employed in the office or at home is made of polypropylene (PP) film, the transparent file is frequently permitted to swell and cockled as the images printed using oil based ink is left sandwiched between the PP films. It may be possible, through the employment of suitable solvent to be included in ink, to prepare an oil based ink which is capable of preventing the swelling of PP film. In this case however, the viscosity of the resultant ink would be increased. In particular, when such a solvent is included in an ink composition which is capable of printing images of high quality on a plain paper (PPC paper) which is most extensively employed in the office or at home, the discharge of the ink would become instable due to an increase of viscosity.

An object of the present invention is to provide an inkjet ink composition which is capable of exhibiting excellent discharge reliability and makes it possible to print an image of high quality on a plain paper without inviting the swelling or damage of a transparent file which is extensively employed in the office or at home.

According to one aspect of the present invention, there is provided an inkjet ink composition comprising pigment, a dispersing agent, and polyalkylene glycol monoether as a solvent; wherein polyalkylene glycol monoether is constituted by 50-90 wt %, based on an entire quantity of the solvent, of tetraethylene glycol monobutylether, and the balance of triethylene glycol monobutylether.

According to another aspect of the present invention, there is provided an inkjet ink composition comprising pigment, a dispersing agent, and polyalkylene glycol monoether as a solvent; wherein polyalkylene glycol monoether is constituted by 80-90 wt %, based on an entire quantity of the solvent, of tetraethylene glycol monobutylether, and the balance of diethylene glycol monobutylether.

According to a further aspect of the present invention, there is provided an inkjet ink composition comprising pigment, a dispersing agent, and polyalkylene glycol monoether as a solvent; wherein polyalkylene glycol monoether is constituted by 50-90 wt %, based on an entire quantity of the solvent, of tetraethylene glycol monobutylether, not more than 20 wt %, based on an entire quantity of the solvent, of diethylene glycol monobutylether, and the balance of triethylene glycol monobutylether.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Next, embodiments of the present invention will be explained.

In the inkjet ink composition according one embodiment of the present invention, polyalkylene glycol monoether which is composed of a mixture of tetraethylene glycol monobutylether and triethylene glycol monobutylether, which are mixed together at a predetermined ratio, is employed as a solvent. More specifically, the content of tetraethylene glycol monobutylether is confined to 50-90 wt % based on an entire quantity of the solvent, the balance of the solvent being constituted by triethylene glycol monobutylether. Preferably, the content of tetraethylene glycol monobutylether should be confined to 60-90 wt % based on an entire quantity of the solvent.

In the inkjet ink composition according another embodiment of the present invention, polyalkylene glycol monoether which is composed of a mixture of tetraethylene glycol monobutylether and diethylene glycol monobutylether, which are mixed together at a predetermined ratio, is employed as a solvent. More specifically, the content of tetraethylene glycol monobutylether is confined to 80-90 wt % based on an entire quantity of the solvent, the balance of the solvent being constituted by diethylene glycol monobutylether.

In the inkjet ink composition according a further embodiment of the present invention, polyalkylene glycol monoether which is composed of a mixture of tetraethylene glycol monobutylether, diethylene glycol monobutylether and triethylene glycol monobutylether, which are mixed together at a predetermined ratio, is employed as a solvent. More specifically, the content of tetraethylene glycol monobutylether is confined to 50-90 wt % based on an entire quantity of the solvent, and the content of diethylene glycol monobutylether is confined to not more than 20 wt % based on an entire quantity of the solvent, the balance of the solvent being constituted by triethylene glycol monobutylether. Preferably, the content of tetraethylene glycol monobutylether should be confined to 60-90 wt % based on an entire quantity of the solvent.

In every embodiments of the present invention, if the content of tetraethylene glycol monobutylether is too small, the discharge reliability of ink will be deteriorated as the ink is left to stand. On the other hand, if the content of tetraethylene glycol monobutylether is too large, the viscosity of ink increases, thereby degrading the quality of image to be obtained. Incidentally, when three kinds of ethers are to be employed, if the content of diethylene glycol monobutylether exceeds 20 wt %, the discharge reliability of ink will be degraded as the ink is left to stand.

As for tetraethylene glycol monobutylether, it is possible to employ Butycenol 40 (Kyowa Hakko Chemicals Co., Ltd.) for example. As for triethylene glycol monobutylether, it is possible to employ Butycenol 30 (Kyowa Hakko Chemicals Co., Ltd.) for example. As for diethylene glycol monobutylether, it is possible to employ Butycenol 20 (Kyowa Hakko Chemicals Co., Ltd.) for example. These ethylene glycol monobutylethers are featured in that as the molecular weight thereof increases, the viscosity thereof increases. Namely, among three kinds of ethylene glycol monobutylethers, tetraethylene glycol monobutylether is the highest in viscosity.

The present inventors have found that when polyalkylene glycol monoether containing tetraethylene glycol monobutylether of high viscosity at an optimum content is employed, it is possible to obtain an inkjet ink composition which is capable of satisfying all of the conditions including the viscosity at a temperature of 25° C., the quality of image to be obtained, the discharge reliability as the ink is left standing, and the inhibition of damage to film, thereby accomplishing the present invention.

As for the examples of pigments useful in this aspect of the present invention, they include photoabsorptive pigments for example. Specific examples of such photoabsorptive pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments including, for example, dye chelate (basic dye type chelate, acidic dye-type chelate, etc.); nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridone pigment; quinacridine pigment; and isoindolinone pigment.

As for the pigments that can be employed in the manufacture of a black ink, it is possible to employ Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex 45, Printex U, Printex V, Printex 140U, Special Black 6, Special Black 5, Special Black 4A and Special Black 4 (all available from Dexa Co., Ltd.).

As for the yellow pigments that can be employed in a yellow ink, examples thereof include C.I. Pigment Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, and C.I. Pigment.

As for the pigments that can be employed in a magenta ink, examples thereof include C.I. Pigment Red 122, C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1 and C.I. Pigment Red 112.

Further, as for the pigments that can be employed in a cyan ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60.

As for the dispersing agent to be employed for dispersing pigment in a solvent, it is possible to employ a pigment dispersing agent which is generally employed in an oil based dispersing medium such as ether. More specifically, it is possible to employ any kind of pigment dispersing agent as long as it is compatible with an oil based organic solvent. Specific examples of the pigment dispersing agent include sorbitan fatty acid ester (sorbitan monooleate, sorbitan monolaurate, sorbitan sesquioleate, sorbitan oleate, etc.); polyoxyethylene sorbitan fatty acid ester (polyoxyethylene sorbitan monooleate, polyoxyethylene sorbitan monooleate, etc.); polyethylene glycol fatty acid ester (polyoxyethylene monostearate, polyethylene glycol diisocyanate, etc.); polyoxyethylene alkylphenyl ether (polyoxyethylene nonylphenyl ether, polyoxyethylene octylphenyl ether, etc.); and a nonionic surfactant such as aliphatic diethanol amide, etc.

Further, it is also possible to employ a polymeric dispersing agent, preferably, those having a molecular weight of 1000 or more. For example, it is possible to employ styrene-maleic acid resin, styrene-acrylic resin, rosin, BYK-160, -162, -164, -182 (urethane-based polymer; Big Chemie Inc.), EFKA-47, LP-4050 (urethane-based polymer dispersing agent; EFKA Inc.), EFKA-4300 (polyacrylate-based polymer dispersing agent; EFKA Co., Ltd.), Solsperse 24,000 (polyester-based polymer; Zeneka Inc.), Solsperse 17,000 (aliphatic diethanol amide-based polymer; Zeneka Inc.), etc.

The inkjet ink composition according to one embodiment of the present invention can be prepared as follows. First of all, ether having high viscosity (tetraethylene glycol monobutylether) is employed as a dispersing agent and mixed with a pigment and a dispersing agent to obtain a mixture, which is then subjected to dispersion treatment by using a dispersing apparatus such as a bead mill. Then, aggregates of pigment, etc. are removed by filter, etc. to obtain a base ink. This base ink is then diluted using a diluent solvent to obtain the inkjet ink composition according to one embodiment of the present invention. The dilution of the base ink is performed in such a manner that the mixing of the diluent solvent is adjusted so as to render the content tetraethylene glycol monobutylether in the solvent included in the ultimate ink composition fall within a prescribed range. As for the diluent solvent, although there will be usually employed a kind of ether which is lower in viscosity than the ether employed as a dispersing medium for the base ink, it is also possible to employ a diluent solvent containing ether having a viscosity which is as high as that of the dispersing medium.

The content of pigment is generally confined to the range of 30 to 50 wt % based on an entire quantity of the ink composition, and the content of dispersing agent is generally confined to the range of 2.5 to 50 wt % based on an entire quantity of the ink composition. Thus, the composition of base ink may be suitably determined so as to enable the ink composition to fall within the aforementioned ranges after the base ink has been diluted with a diluent solvent.

Next, the present invention will be further explained in detail with reference to examples. Incidentally, it should be noted that, as long as it is departed from the technical concept of the present invention, the scope of the present invention should not be construed as being restricted by the following examples.

First of all, a base ink was prepared according to the following procedures.

To 50 g of tetraethylene glycol monobutylether (Butycenol 40; Kyowa Hakko Chemicals Co., Ltd.) employed as a dispersion medium was added 30 g of channel black (C.I. No. 77266: Special Black 4A; Dexa Co., Ltd.) as a pigment and 20 g of ethylene oxide-propylene oxide block copolymer as a pigment dispersing agent to prepare a mixture. The resultant mixture was stirred by dispersion mixer and further dispersed by bead mill. Finally, aggregates of pigment, etc. were removed by filter to obtain a base ink 1.

The same procedures as described above were repeated except that the pigment was changed to Hostaperm Yellow H4G (Pig. Y. 151, Clarient) to obtain a base ink 2.

The same procedures as described above were repeated except that the pigment was changed to Hostaperm Pink E-WD (Pig. P. 122, Clarient) to obtain a base ink 3.

The same procedures as described above were repeated except that the pigment was changed to PV Fast Blue 2GLSP (Pig. Blue. 15:3, Clarient) to obtain a base ink 4.

The same procedures as described above were repeated except that the dispersing agent was changed to Solsperse 13940 (Avecia Co., Ltd.) and the dispersing medium was changed to liquid paraffin (Moresco white P-40; Muramatsu Sekiyu Co., Ltd.) to obtain a base ink 5.

As a diluent solvent, various kinds of ether were added to the base ink 1 at a predetermined ratio to prepare inkjet oil based ink compositions of Examples of 1 to 10. As for diluent solvents, there were prepared tetraethylene glycol monobutylether (Butycenol 40; Kyowa Hakko Chemicals Co., Ltd.), triethylene glycol monobutylether (Butycenol 30; Kyowa Hakko Chemicals Co., Ltd.), and diethylene glycol monobutylether (Butycenol 20; Kyowa Hakko Chemicals Co., Ltd.). These ethers were added to the base ink 1 so as to make the contents (wt %) thereof based on an entire quantity of solvent become the values shown in the following Table 1. Incidentally, the entire quantity of solvent mentioned herein means a total of the quantity of dispersing medium in the base ink and the quantity of diluent solvent employed for dilution. Each of base inks 1 having a diluent solvent incorporated therein was stirred to prepare the ink compositions of Examples 1 to 10.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Ether | Tetraethylene glycol monobutylether | 90 | 80 | 60 | 50 | 90 | 80 | 90 | 80 | 60 | 50 |
| | Triethylene glycol monobutylether | 10 | 20 | 40 | 50 | | | 5 | 10 | 20 | 30 |
| | Diethylene glycol monobutylether | | | | | 10 | 20 | 5 | 10 | 20 | 20 |

Ethers were added as a diluent solvent to the base ink 1 so as to make the contents (wt %) thereof based on an entire quantity of solvent become the values shown in the following Table 2, thereby preparing the ink compositions of Comparative Examples 1 to 4. Further, liquid paraffin (Moresco white P-40; Muramatsu Sekiyu Co., Ltd.) was added to the base ink 1 so as to make the content (wt %) thereof based on an entire quantity of solvent become the value shown in the following Table 2, thereby trying to prepare the ink compositions of Comparative Example 5. Although the viscosity of the liquid paraffin employed was 5.3 mPa·s at a temperature of 25° C., the liquid paraffin was incompatible with the base ink, thereby causing the aggregation of pigment, thus failing to obtain an ink composition. Further, the same kind of liquid paraffin as described above was added to the base ink 5 to prepare the ink composition of Comparative Example 6. As shown in the following Table 2, in the case of Comparative Example 1, 100 wt % of the solvent of ink composition was tetraethylene glycol monobutyl ether, while in the case of Comparative Example 6, 100 wt % of the solvent of ink composition was liquid paraffin.

TABLE 2

| | | Comparative Examples | | | | | |
|---|---|---|---|---|---|---|---|
| | | 1 | 2 | 3 | 4 | 5 | 6 |
| Ether | Tetraethylene glycol monobutylether | 100 | 40 | 70 | 50 | 50 | |
| | Triethylene glycol monobutylether | | 60 | | 20 | | |
| | Diethylene glycol monobutylether | | | 30 | 30 | | |
| Liquid paraffin | Moresco white P40 | | | | | 50 | 100 |

In every ink compositions, the weight of base ink as well as the weight of the diluent solvent to be employed in the dilution were made constant. Therefore, in all of the ink compositions of Examples 1 to 10 and Comparative Examples 1 to 6, the content of the pigment was 13.8 wt % based on an entire quantity of ink composition and the content of the pigment dispersing agent was 9.2 wt % based on an entire quantity of ink composition.

Each of the inkjet ink composition obtained was investigated with respect to the viscosity thereof at a temperature of 25° C. by using a viscometer (TV-33 type viscometer; Tohki Sangyo Co., Ltd.). When the easiness of feeding ink to an inkjet head is taken into consideration, the viscosity of ink at a temperature of 25° C. should preferably be not more than 60 mPa·sec or so. The results of the investigation thus obtained are summarized in the following Tables 3 and 4. Incidentally, in the case of the ink composition of Comparative Example 5, since the pigment thereof aggregated as described above, it was impossible to evaluate the characteristics of ink.

As described bellow, the quality of recorded image, the discharge reliability of ink after ink has been left standing, and damage to the transparent film of resin file were investigated on the ink compositions of Examples 1 to 10 and Comparative Examples 1 to 4, 6.

In the evaluation of quality of recorded image, a discharge testing device having a piezo-type inkjet head (type: CB1, 318 nozzles; Toshiba Tec Co., Ltd.) mounted thereon was employed to form an image on a plain paper (P-50S copy paper; Toshiba Tec Co., Ltd.).

In the case of the piezo-type inkjet head, the viscosity of ink enabling stable discharging of ink is confined to 5 to 25 mPa·sec. When an ink having high viscosity is to be discharged, the inkjet head is heated to lower the viscosity of ink, thus facilitating the discharge of ink. However, when the temperature of heating the inkjet head is too high, the driving IC mounted on the inkjet head may be damaged. Therefore, the upper limit of the temperature of heating the inkjet head is set to about 70° C.

Since there is a limit to the temperature of heating the inkjet head as described above, it is impossible to sufficiently reduce the viscosity of ink if an ink composition to be discharged is too high in viscosity at a temperature of 25° C. As a result, a nozzle which is incapable of discharging ink generates, thus generating an image accompanying an unprinted portion. In this investigation, a solid image of 300 dpi was printed as an image and the generation of white line due to unprinted portion was visually determined, thus assessing the printed image according to the following criteria.

○: A normal image which was free from white line

X: An image accompanying a white line due to the generation of nozzle which was incapable of discharging ink The results thus obtained are summarized at the third line of the following Tables 3 and 4.

The assessment of discharge reliability of ink after the ink had been left standing was performed as follows. First of all, a solid image was printed on a plain paper by using the entire 318 nozzles of the aforementioned inkjet head. Thereafter, the discharge testing device was left to stand as it was for 15 minutes and then another solid image was printed on the paper by using the entire nozzles. The discharge reliability of ink after the ink had been left standing was assessed based on the generation of unprinted portion in the image thus obtained.

Usually, the discharge failure can be recovered by conducting the maintenance operation of the inkjet head. This maintenance operation can be performed by procedures wherein ink is forcedly introduced into the inkjet head and discharged therefrom through the nozzles, and then the ink overflowed from the nozzles is sucked. If a kind of ink which cannot be left standing for a long period of time is to be employed, the aforementioned maintenance operation is required to be performed quite frequently, thereby increasing the consumption of ink or degrading the printing efficiency. In order to obviate these problems, it is desirable to employ an ink which is capable of obtaining a normal printed image even after the discharge testing device is left standing for a while.

The printed image which was obtained after the discharge testing device was left standing for a while was assessed according to the following criteria, the results being summarized at the fourth line of the following Tables 3 and 4.

○: A normal image free from white line (unprinted portion)

Δ: An image where the first lateral line was distorted in elevational direction

X: An image accompanying a white line due to the generation of nozzle which was incapable of discharging ink Incidentally, "Δ" was considered allowable level.

The investigation of damage to the resin film was performed as follows. First of all, by using each of the inkjet ink compositions, a solid image was printed in an area of ⅓ of A4 size paper. The printed image thus obtained was placed in A4 REFILE (La A21N; Kokuyo Co., Ltd.) and in a transparent pocket file (No. 103; King Jim Co., Ltd.) and preserved therein for 10 days at room temperature (25° C.). Thereafter, the damage, if any, of the resin file due to the deformation of film was assessed according to the following criteria, the results being summarized at the fifth line of the following Tables 3 and 4.

○: Free from deformation

X: Deformed due to the swelling of film

TABLE 3

| | Examples | | | | | | | | | |
|---|---|---|---|---|---|---|---|---|---|---|
| | 1 | 2 | 3 | 4 | 5 | 6 | 7 | 8 | 9 | 10 |
| Viscosity (25° C.) | 59.5 | 59.0 | 55.6 | 52.2 | 57.6 | 47.4 | 58.5 | 52.2 | 45.3 | 44.2 |
| Quality of image | ○ | ○ | ○ | ○ | ○ | ○ | ○ | ○ | ○ | ○ |
| Discharge reliability after being left standing | ○ | ○ | ○ | Δ | ○ | ○ | ○ | ○ | Δ | Δ |
| Film damage | ○ | ○ | ○ | ○ | ○ | ○ | ○ | ○ | ○ | ○ |

TABLE 4

| | Comparative Examples | | | | | |
|---|---|---|---|---|---|---|
| | 1 | 2 | 3 | 4 | 5 | 6 |
| Viscosity (25° C.) | 64.0 | 44.1 | 33.6 | 42.1 | — | 20.2 |
| Quality of image | X | ○ | ○ | ○ | X | ○ |
| Discharge reliability after being left standing | ○ | X | X | X | — | ○ |
| Film damage | ○ | ○ | ○ | ○ | — | X |

As shown in Table 3, the ink compositions of Examples 1 to 10 were all not higher than 60 mPa·s in viscosity at a temperature of 25° C., thus enabling these ink compositions to be discharged smoothly from the inkjet head. The images thus recorded by using these ink compositions of Examples 1 to 10 were all excellent in quality and free from white line. Further, the discharge reliability of these ink compositions after being left standing was also confined within an allowable range. Further, the generation of damage of film of the resin file was substantially prevented. Especially, as shown in Example 3, when the content of tetraethylene glycol monobutylether was controlled to 60 wt % based on an entire quantity of solvent, it was possible to sufficiently decrease the viscosity of ink composition at a temperature of 25° C., thus enabling the ink composition to exhibit excellent discharge reliability after being left standing. Further, as shown in the results of Examples 7, 8, 9 and 10, when three kinds of ether are to be employed, the content of tetraethylene glycol monobutylether should preferably be confined within the range of 50 to 90 wt % based on a total quantity of solvent.

As described above, the ink compositions of these examples were capable of satisfying all of the conditions including the viscosity at a temperature of 25° C., the quality of image, the discharge reliability after being left standing, and the inhibition of damage to film.

In the cases of the ink compositions of comparative examples however, it was impossible to secure all of these characteristics. As shown in Table 4, since the viscosity at 25° C. of the ink composition of Comparative Example 1 was as high as 64 mP·sec, a white line was caused to generate in a printed image. In the cases of the ink compositions of Comparative Examples 2 and 3, they indicated inferior discharge reliability after being left standing. The reasons for these phenomena can be reasoned as follows.

If the content of triethylene glycol monobutylether and/or diethylene glycol monobutylether is relatively large and the content of tetraethylene glycol monobutylether is relatively small, the ejecting direction of ink drop would become instable. As a result, a printed image where the first lateral line is distorted would generate. When the content of triethylene glycol monobutylether and/or diethylene glycol monobutylether is further increased, a white line due to ink-discharge failure would generate.

In the case where two kinds of ethers consisting of tetraethylene glycol monobutylether and triethylene glycol monobutylether are employed, if the content of triethylene glycol monobutylether is increased to 60 wt % based on an entire quantity of solvent as shown in Comparative Example 2, a white line is caused to generate in a printed image after being left standing.

In the case where two kinds of ethers composed of tetraethylene glycol monobutylether and diethylene glycol monobutylether are employed, if the content of diethylene glycol monobutylether is increased to 30 wt % based on an entire quantity of solvent as shown in Comparative Example 2, a white line is caused to generate in a printed image after being left standing.

In the case where three kinds of ethers composed of tetraethylene glycol monobutylether, triethylene glycol monobutylether, and diethylene glycol monobutylether are employed, if the content of tetraethylene glycol monobutylether is increased to 50 wt % based on an entire quantity of solvent, and the content of diethylene glycol monobutylether is increased to 30 wt % based on an entire quantity of solvent as shown in Comparative Example 4, a white line is caused to generate in a printed image after being left standing.

In the case where three kinds of ethers are employed, if the content of tetraethylene glycol monobutylether is confined to 50 wt % based on an entire quantity of solvent, and the content of diethylene glycol monobutylether is confined to 20 wt % based on an entire quantity of solvent, it is possible to obtain a printed image which is free from a white line even though a first lateral line of the printed image may be distorted in elevational direction as shown as Example 10 in Table 3.

Incidentally, in the case where all of the solvent in the ink composition is occupied by liquid paraffin, even if the viscosity of ink composition at 25° C. and the quality of printed image may be satisfactory, the deformation of the transparent film of resin file would generate as seen from the results of Comparative Example 6.

In the cases of cyan, magenta and yellow inks which have been prepared by diluting the base inks 2, 3 and 4 with a diluent solvent also, the same results as described above were obtained. In order to obtain an ink composition provided with desired characteristics, the content of tetraethylene glycol monobutylether should be confined within the range of 50 to 90 wt % based on an entire quantity of the solvent if the polyalkylene glycol monoether solvent is constituted by a mixture consisting of tetraethylene glycol monobutylether and triethylene glycol monobutylether. In the same sense, the content of tetraethylene glycol monobutylether should be confined within the range of 80 to 90 wt % based on an entire quantity of the solvent if the polyalkylene glycol monoether solvent is constituted by a mixture consisting of tetraethylene glycol monobutylether and diethylene glycol monobutylether.

Likewise, if the polyalkylene glycol monoether solvent is constituted by a mixture consisting of tetraethylene glycol monobutylether, diethylene glycol monobutylether and triethylene glycol monobutylether, the content of tetraethylene glycol monobutylether should be confined within the range of 50 to 90 wt % based on an entire quantity of the solvent and the content of diethylene glycol monobutylether should be confined to not more than 20 wt % based on an entire quantity of the solvent.

By using the polyalkylene glycol monoether solvent which is constituted by a specific content of tetraethylene glycol monobutylether, and the balance of triethylene glycol monobutylether and/or diethylene glycol monobutylether, it was possible to obtain an inkjet ink composition satisfying all of the features including the viscosity at a temperature of 25° C., the quality of image, the discharge reliability after being left standing, and the inhibition of damage to film.

As described above, according to one aspect of the present invention, it is possible to provide an inkjet ink composition which is capable of exhibiting excellent discharge reliability and makes it possible to print an image of high quality on a plain paper without inviting the swelling or damage of a transparent file which is extensively employed in office or home.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inkjet ink composition comprising pigment, a dispersing agent, and polyalkylene glycol monoether as a solvent; wherein polyalkylene glycol monoether is constituted by 50-90 wt %, based on an entire quantity of the solvent, of tetraethylene glycol monobutylether, and the balance of triethylene glycol monobutylether.

2. The inkjet ink composition according to claim 1, wherein the polyalkylene glycol monoether comprises 60-90 wt %, based on an entire quantity of the solvent, of tetraethylene glycol monobutylether.

3. An inkjet ink composition comprising pigment, a dispersing agent, and polyalkylene glycol monoether as a solvent; wherein polyalkylene glycol monoether is constituted by 80-90 wt %, based on an entire quantity of the solvent, of tetraethylene glycol monobutylether, and the balance of diethylene glycol monobutylether.

4. An inkjet ink composition comprising pigment, a dispersing agent, and polyalkylene glycol monoether as a solvent; wherein polyalkylene glycol monoether is constituted by 50-90 wt %, based on an entire quantity of the solvent, of tetraethylene glycol monobutylether, not more than 20 wt %, based on an entire quantity of the solvent, of diethylene glycol monobutylether, and the balance of triethylene glycol monobutylether.

5. The inkjet ink composition according to claim 4, wherein the polyalkylene glycol monoether comprises 80-90 wt %, based on an entire quantity of the solvent, of tetraethylene glycol monobutylether.

* * * * *